United States Patent Office 3,245,466
Patented Apr. 12, 1966

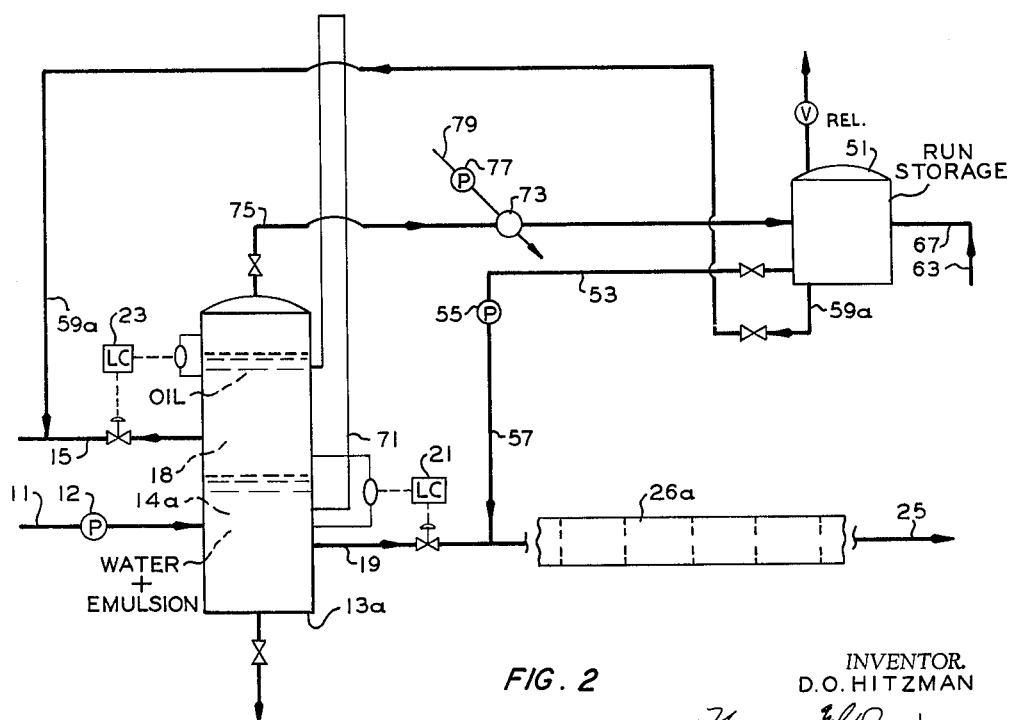

3,245,466
BREAKING OIL-IN-WATER EMULSIONS AND REMOVAL OF SOLID MATTER FROM THE OIL
Donald O. Hitzman, Bartlesville, Okla., assignor to Phillips Petroleum Company, a corporation of Delaware
Filed Aug. 3, 1962, Ser. No. 214,707
4 Claims. (Cl. 166—7)

This invention relates to breaking of oil-in-water emulsions. In one aspect it relates to breaking oil field emulsions which are normally difficult to break. In another aspect, it relates to breaking oil field emulsions encountered in salt water disposal and in water flood, secondary oil recovery operations, and which tend to plug water filters and the oil bearing formations in the vicinity of the water input wells.

A chronic problem in water flooding and in salt water disposal, connected with oil production, has been the oil-in-water emulsions which remain in the water after treatment of the produced liquids to remove stock tank oil. In reinjecting this water, the trace amounts of residual oils in emulsion form hamper the water injection system in several different ways: (1) by decreasing the effectiveness of the filters; (2) by inactivation of some chemical additives which should be in the water phase but are soluble in oil and thus lose their effectiveness; and (3) by combining with various solid and other materials to form a material closely resembling "shoe polish" which is believed to be the chief plugging agent of the injection wells.

The term "quality of water" as used in this specification and claims relates to freedom from or presence of materials whether liquid or solid, which cause plugging of injection wells or filters used to prepare water for injection. When present, such materials plug filters or otherwise shorten their on-stream times thus necessitating frequent backwashings. Materials encountered in poor quality water include not only the oil-in-water emulsions but also such materials as suspended calcium carbonate, calcium sulfate, barium sulfate, iron sulfide iron oxide, free sulfur, algae, iron bacteria, sulfate reducing bacteria and free oil droplets. These materials are ordinarily suspended in the water phase and they are usually oil coated. Thus, on removing oil from the water phase of the stock tank, it has been discovered that the separated oil phase contains appreciable quantities of one or more of the above-mentioned solid or semi-solid materials. The most notable solid materials found in or among those recovered from the water filters are iron sulfide and iron oxide. In addition to being covered or coated with a film of oil, much of the solid material in many cases is coated with paraffin wax. These solid materials, although they themselves are usually specifically heavier than water, when coated with oil or paraffin wax which is lighter than water, exhibit a reduced tendency to settle or they can even float on water.

An object of this invention is to provide a method and apparatus for breaking oil-in-water emulsions. Another object of this invention is to provide a method and apparatus for breaking oil field emulsions which are difficult to break. Another object of this invention is to provide a method and apparatus for breaking oil field emulsions encountered in salt water disposal and in water flood secondary oil recovery operations, and which tend to plug the water filters. Other objects and advantages of this invention will be realized upon reading the following description which, taken with the attached drawing, forms a part of this specification.

According to this invention, I have found that the difficult-to-break emulsions can be resolved by treating the stock tank water with a solvent such as Stoddard solvent, kerosene, natural gasoline, naphtha, or other similar type of hydrocarbons. The natural gasoline and naphtha used according to this invention should be, preferably, of low vapor pressure materials to reduce vapor losses in their handling. While such materials as benzene or carbon tetrachloride are operable in the process of this invention, their use is not preferred because of their slight solubility in water. By being at least slightly soluble in water, losses of these materials when treating relatively large volumes of water would be quite high and would render the process uneconomic.

According to this invention, I use one of the above-mentioned materials as the solvent for the oil or paraffin droplets or solid particles or as oil coated or paraffin coated insoluble materials. Upon contacting the oil or paraffin particles or the oil or paraffin coated solid materials with one of the above-solvents, the oil or paraffin is dissolved. Also, upon dissolving the oil or paraffin coatings from solid materials, they are free for settling in a settling vessel. In rare cases in which uranium containing materials are contained in the water, the oil or paraffin wax can coat such materials and upon treatment according to this invention these uranium materials are freed from oil or from wax and can easily settle in a suitable vessel.

In the drawing, FIGURE 1 illustrates, in diagrammatic form, an arrangement of apparatus parts for carrying out the process of this invention. FIGURE 2 is an alternate embodiment of portions of the apparatus of FIGURE 1.

In the drawing, reference numeral 11 identifies a conduit leading from one or more output wells or oil and water production wells in a waterflood operation. Conduit 11 is provided with a pump 12 for promoting flow of the production liquid from the wells into an oil-water separator tank 13. This separator tank 13 is frequently called a stock tank. In tank 13, settling time is provided so as to give the produced oil an opportunity to rise with the formation of an oil layer 18, and the production of a bottom water layer 14. Oil and water which do not easily separate from each other collect as an emulsion layer 16 between the oil and water layers. It is this emulsion layer which is quite difficult to break for recovery of the oil and for producing water suitable for reinjection via water input wells.

In many instances the residual emulsion does not form a distinct layer in tank 13. In such cases the emulsion remains suspended in the water and is removed with the water passed to the filters or to the water injection wells. In such cases the residual emulsion does not represent large volumes of oil but even very small amounts of filter plugging material can be troublesome and expensive to treat.

From this separator tank 13 the oil layer is removed through a conduit 15, the removal being regulated by the operation of a float controller assembly 23. Water which accumulates as the bottom layer 14 in the tank and the emulsion oil are removed through a conduit 19 and their removal is regulated by an interface liquid-liquid control assembly 21. Settlings in tank 13 are removed via conduit 17.

Ordinarily the amount of emulsion which is difficult to break is relatively small. However, this amount of emulsion along with the water layer 14 is removed through conduit 19 and the removal is regulated by an interface controller apparatus 21. The natural gasoline or naphtha, preferably, is introduced from a conduit 57 to the contents passing through conduit 19. From conduits 19 and 57 these liquids pass in turbulent flow through a straight conduit or through an incorporating device such as a pipe containing a plurality of U-shaped sections, as a mixer 26, and then on through a conduit 25, the mixture finally entering a skim tank 27. The natural gasoline, or naphtha from conduit 57 is a distillation product and is free from emulsion forming materials. Thus this naphtha or gasoline intimately contacts the oil material in the water and dissolves the oily or paraffin materials thus freeing any solid materials entrained in the oil or wax. The freed solid material then has ample opportunity in skim tank 27 to settle. The naphtha or gasoline phase containing the small amount of oil or wax in solution easily rises to the top of a water phase 29 as a solvent phase 31. This solvent phase flows into the upper end of a conduit 33, provided as illustrated in vessel 27, and thence on through a conduit 35 either for direct recycling to the mixing operation or for passage through a conduit 36 into a still 45. The water phase 29 is withdrawn from vessel 27 by way of a conduit 30 and is passed either through a conduit 44 directly by way of a pump 41 to one or more injection wells 43 or, if desired as a safety measure, the settled water is passed from conduit 30 through a conduit 37 through a filter 39 then by way of conduit 40, pump 41 to the injection wells. It is preferable to use a filter 39 for safety reasons to remove traces of emulsion and so that upon accidental upset of operation of the process emulsion will not be returned to the input wells. Occasionally some water is withdrawn through a conduit 34 for removal of settled material from tank 37. The emulsion-free water is withdrawn from tank 27 as mentioned through conduit 30 and this withdrawal is regulated by an interface controller assembly 32 operated in response to a float so positioned in tank 27 as to prevent accidental passage of water downward through overflow pipe 33.

The amount of oil actually dissolved by the solvent in the mixer 26 is ordinarily relatively small. In fact, it is so small that continuous distillation of the solvent from the oil is not ordinarily required. When distillation is not required, the solvent passing through downflow conduit 33, and conduit 35 is bypassed by still 45 and passes through conduit 61, conduit 65, conduit 53, pump 55 and conduit 57 to the mixer 26. In case a surge tank is employed in this operation, a valve in conduit 65 is closed and a valve in conduit 63 is opened and the solvent passed through conduit 67 into tank 51 as a surge tank. From this tank then as required, the solvent flows through pipe 53 with its valve being opened for return to the mixer 26.

When it is desired to separate the dissolved oil and/or wax from the solvent, the valves in conduits 63 and 65 are closed and the valve in conduit 35 is opened for passage of the solvent through conduit 36 with its valve being opened. The still 45 is operated in a conventional manner for recovery as overhead vapor the solvent through a conduit 47 which solvent is condensed in a condenser 49 and passed through a conduit 67 into the run storage tank 51. The oil and/or wax separated from the solvent in still 45 is withdrawn therefrom through a conduit 59 for such disposal as desired.

The bottoms material from still 45 passing through conduit 59 can if desired, be combined with the oil phase 18 passing through conduit 15 merely by opening a valve in conduit 59.

The conduit 38 being provided with a valve, is for the purpose of adding natural gasoline, naphtha or other suitable solvent to the system for its initial operation. In such an operation as herein disclosed, the operability for breaking emulsions and for dissolving the oil from the oil-in-water emulsion is visually apparent merely by inspecting the separated solvent phase flowing through conduit 35. When even a small amount of crude oil from an emulsion phase is contained in natural gasoline or distillate naphtha, the naphtha or gasoline is clearly off color, being darkened by the crude oil. Upon recirculation of this gasoline or naphtha solvent in continued operation it becomes quite dark in color. Upon continued operation of the process, the need for distilling and and for removal of crude oil from the solvent may be determined from experience based upon the color of the solvent passing through conduit 35.

In FIGURE 2, production oil and water from one or more output wells, not shown, flow via conduit 11, pump 12 to a heater-treater tank 13a. Stove 71 heats the oil and water to expedite as much separation as possible between the oil and the water. Since the liquids in tank 13a are hot, light hydrocarbon vapor is withdrawn through a conduit 75 and is passed through a condenser 73 and condenser effluent, i.e., condensate and uncondensed vapor, passes on to the run tank 51. Water, from a source not shown, as coolant, is pumped by pump 77 through a conduit 79 to the indirect heat exchange condenser 73. The condensate entering tank 51 is a very light naphtha-type hydrocarbon liquid and it serves the purpose of emulsion breaking of this invention in an unexpectedly efficient manner. Also, by condensing a portion of the heater-treater vapors, as in condenser 73, the solvent is produced in this operation. In this manner solvent does not need to be purchased nor shipped in from a remote point, thereby effecting an appreciable economy. In case more condensate is produced over a period of time than is required for the operation, the valve in conduit 59a, FIGURE 2, is opened and a portion of the solvent is added to the production oil passing through conduit 15.

In the embodiment illustrated in FIGURE 2, the still 45 of FIGURE 1 is not required. That is, a still need not be purchased; also, reboiling heat and reflux cooling are not required.

Oil-water emulsion 14a from tank 13a is passed through conduit 19 to another type of mixer 26a, illustrated in FIGURE 2. This mixer is an orifice plate mixer involving use of a plurality of spaced orifice plates. The openings in these plates can, if desired, be centered in the plates or they can be staggered. As still another alternative a baffle mixer is suitable as mixer 26a. In this case the orifice plates are replaced by baffles, each baffle covering a major portion of the cross section of the mixing pipe. The baffles can be staggered or all uniformly aligned, as desired. These alternative types of mixers can be substituted for the U-bend mixer of FIGURE 1, if desired.

SPECIFIC EXAMPLE

Water, 25 parts by volume, at an injection well head in a waterflood operation of the North Burbank Oil Field in Oklahoma, was run through a vessel containing an amount, 1 part by volume, of Stoddard solvent. Mild agitation was provided by a stirrer corresponding to the mixing obtainable in mixers 26 and 26a, illustrated in the drawing. The water-solvent mixture was continuously removed from this vessel and run into another vessel which corresponded to skim tank 27. Water, continuously removed from the bottom of this vessel, was ready for reinjection into the input well. The solvent became colored due to absorbed oil. The solvent also liberated solid matter by dissolving a film of oil and/or wax therefrom.

A control run was made using the same water which was not passed through the solvent wash. The efficiency of this solvent wash procedure was determined by two different methods. One method involved the determination of the length of time required to pass a certain volume of water through a millipore filter, which retained all material a half micron or larger in size. This means of testing gives a good idea of the quality of water being injected. The other means of checking the freedom of the treated water from emulsion oil was to expose the filter and filter effluent to ultraviolet light. The oil retained on the filter and oil in the effluent fluoresce in case any oil is present.

The checking of the efficiency of this operation was made by type HA (Hydrosol Assay) millipore filters which filters have a pore size of about 0.45 micron. In the following tabulation are given data illustrating the length of time required to pass a given volume of untreated water through such a millipore filter compared with passing a given volume of water treated according to this invention through a similar millipore filter.

TABLE I.—*Effect of continuous solvent extraction on oil removal and injection quality of water*

| Treatment | Ml. of Water Passed through filter | Time Required | Presence of Oil | |
|---|---|---|---|---|
| | | | On filter [1] | On filtrate |
| 1. None—field injection water containing emulsion. | 150 | 25 min | Yes | No. |
| 2. None—field injection water containing emulsion. | 100 | 11 min., 20 sec | Yes | No. |
| 3. Extracted by solvent (Stoddard solvent). | 100 | 15 sec | No | No. |

[1] Oil presence determined by U.V. light.

To determine the extent that oil plugs a millipore filter, oil-in-water mixtures, in various ratios, were passed through millipore filters. Distilled water was employed because of its low plugging rate. The length of time required for these mixtures to pass through HA millipore filters under a constant vacuum of 29 mm. of mercury is given in the following Table II.

TABLE II.—*Time required for passage of liquids through a millipore filter*

Description of liquid:                                   Time required for Filtration
(1) 500 ml. distilled water _____ 1 min. 9 sec.
(2) 500 ml. distilled water _____ 1 min. 20 sec.
(3) 500 ml. distilled water _____ 1 min. 20 sec.
(4) 500 ml. distilled water+crude oil emulsion (.5 ml. oil) _____ 4 min. 43 sec.
(5) 500 ml. distilled water+crude oil emulsion (.1 ml. oil) _____ 3 min. 27 sec.
(6) 500 ml. distilled water+ crude oil emulsion (.05 ml. oil) _____ 4 min. 25 sec.
(7) 500 ml. distilled water+crude oil emulsion (.5 ml. oil) (oil+benzene wet filter) _____ 4 min. 6 sec.
(8) 500 ml. distilled water+crude oil emulsion (.5 ml. oil) (benzene wet filter) _____ 4 min. 12 sec.
(9) 500 ml. distilled water (benzene wet filter) _____ 1 min. 0 sec.

The oil-in-water emulsions definitely plug millipore filters but the amount of oil does not appear to be as important as merely its presence. Apparently it makes no difference if the filter was initially water or oil-wet as it took about the same time for fluid passage under both conditions. These data confirm the point that oil which could cause plugging of the millipore filter was removed by the herein disclosed solvent extraction procedure.

The millipore filters mentioned hereinabove are cellulose ester membrances manufactured by the Millipore Filter Corporation, Watertown, Massachusetts. The filters used in these runs were 47 mm. in diameter and have a pore size of 0.45 micron.

Thus, according to the process of this invention, by removing the emulsion of oil-in-water or of oil or paraffin coated solid matter-in-water, the water is in much more usable condition for reinjection into the water input wells. Thus insoluble droplets and particles, that is insoluble in water, are not reintroduced into the fine pores of the input formation for plugging therein. As is well known in this waterflood art, once a formation is plugged at the input well, it is very difficult, if not impossible, to remove any or a substantial amount of the plugging material. Thus the preferred operation in such a water-flood operation is to make certain that the water is in proper condition prior to introduction into the injection well.

The ratio of recycle solvent from conduit 57 to water and emulsion from conduit 19 is not critical. The main requirement is that sufficient solvent be added to the water and emulsion to dissolve any paraffin wax and/or oil covering solid matter and to provide an easily floatable liquid hydrocarbon phase for separation from water in the skim tank 27. As far as dissolving the emulsified liquid crude oil, almost any reasonable volume of solvent used relative to the volume of water will take up the liquid oil providing gentle agitation and mixing is sufficient for the solvent to contact the oil droplets of the emulsion.

Merely as an example of operable and preferable ratios of solvent to water plus emulsion, the ratio can be as low as .1 percent solvent based on the volume of the water and emulsion being treated. The upper limit is an economic limit; that is, when the ratio is high, as, for example, 1 to 1 (solvent to water-emulsion by volume) solvent handling costs mount. Substantially all ratios of 0.1 percent and higher of solvent to water-emulsion are operable. A preferable ratio of solvent to water-emulsion is from 0.1 to 0.2 percent based on the volume of the water-emulsion being treated. In many instances, liquid level controllers are not used on oil-water separator tanks or on heater-treaters for economic reasons. When these controllers are not used, it sometimes happens that a slug of crude oil passes through conduit 19, in both FIGURES 1 and 2, and is mixed with the solvent in mixer 26, and 26a. In this case this oil and solvent will be separated in skim tank 27. Conduit 25 of FIGURE 2 passes oil-solvent-water to skim tank 27, illustrated in FIGURE 1. From the skim tank 27 there will be a larger volume than normal of oil-solvent passing through conduit 33 to still 45 (FIGURE 1) or through conduits 63, 67 in either figure. In this case it is merely necessary to pass a portion of the liquid from tank 51 via conduit 65 of FIGURE 1 or to pass liquid from tank 51 via conduit 59a of FIGURE 2, to the make oil in conduit 15.

While certain embodiments of the invention have been described for illustrative purposes, the invention obviously is not limited thereto.

That which is claimed is:

1. A process for separation of a crude oil-in-water mixture containing stratum plugging material and water-oil emulsion, said mixture being recovered from a waterflooding operation from an output well in a permeable oil stratum, and reinjecting recovered water into said stratum thru an input well, said process comprising the steps of:
   (a) passing said mixture to a first gravity separation zone so as to separate same into an upper oil phase and a lower water phase containing a water-oil emulsion and stratum plugging material;
   (b) passing the lower phase containing said water-oil emulsion and stratum plugging material suspended therein in admixture with a relatively light hydrocarbon solvent for said oil thru a mixing zone so as to dissolve said oil in said solvent and free the dissolved oil of plugging material;
   (c) passing the effluent from the mixing zone of step (b) to a second gravity separation zone so as to separate said effluent into an upper solvent-oil phase and a lower water phase substantially free of oil and solvent and plugging material;

(d) passing the water phase free of plugging material of step (c) into said stratum thru an input well associated with said output well thru said stratum as waterflooding water to produce more oil therefrom, thereby avoiding plugging of the stratum with said plugging material;
(e) heating the zone of step (a) so as to distill off light hydrocarbons from the oil therein;
(f) condensing the light hydrocarbons from step (e); and
(g) passing the condensed hydrocarbons from step (f) to step (b) as said solvent.

2. A process comprising the steps of:
(a) producing a crude oil-in-water mixture containing a minor proportion of crude oil in the form of a refractory emulsion and a sediment forming material having plugging tendencies in a permeable oil-bearing stratum by driving water thru said stratum from an input well to an output well therein;
(b) subjecting the produced mixture of step (a) to gravity separation to form an upper oil layer and a lower water layer containing said emulsion and said material;
(c) recovering said upper oil layer as a product of the process;
(d) intimately mixing said water layer, including said emulsion and material, with a water insoluble solvent for crude oil so as to dissolve the crude oil from said emulsion and free said material;
(e) subjecting the resulting mixture of step (d) to a second gravity separation to form an upper layer of oil-in-solvent, and a lower layer of water, said material settling to the bottom of the water layer;
(f) reinjecting water from the lower layer of step (e) substantially free of said material into an input well in said stratum as waterflood and driving same thru said stratum to an output well therein to recover additional oil;
(g) heating the mixture of step (a) so as to distill off light hydrocarbons therein;
(h) condensing the light hydrocarbons from step (g); and
(i) passing the condensed hydrocarbons from step (h) to step (d) as said solvent.

3. Apparatus for breaking an oil-in-water emulsion and separating the oil from the water comprising in combination:
(a) an oil-water gravity separation vessel having a feed inlet in an intermediate section for water containing said emulsion, an outlet for oil in an upper section, an outlet for water containing said emulsion in lower section, and an outlet in the bottom section for water and sediment;
(b) a skim tank having an inlet in a lower section for a feed comprising water, oil, and solvent, an outlet from an upper level therein for a solvent-oil solution, and an outlet in the bottom section thereof for water;
(c) a conduit connecting the outlet for water and emulsion of (a) with the inlet for feed of (b), said conduit having therein mixing means for mixing a solvent with the water and emulsion;
(d) a solvent feed line connecting with the upstream end of the mixing means of (c);
(e) heating means for heating the contents of the vessel of (a);
(f) a vapor outlet from the top section of the vessel of (a); and
(g) conduit means connecting the outlet of (f) with the solvent feed line of (d).

4. Apparatus for breaking an oil-in-water emulsion and separating the oil from the water comprising in combination:
(a) an oil-water gravity separation vessel having a feed inlet in an intermediate section for water containing said emulsion, an outlet for oil in an upper section, an outlet for water containing said emulsion in a lower section, and an outlet in the bottom section for water and sediment;
(b) a skim tank having an inlet in a lower section for a feed comprising water, oil, and solvent, an outlet from an upper level therein for a solvent-oil solution, and an outlet in the bottom section thereof for water;
(c) a conduit connecting the outlet for water and emulsion of (a) with the inlet for feed of (b), said conduit having therein mixing means for mixing a solvent with the water and emulsion;
(d) a solvent feed line connecting with the upstream end of the mixing means of (c);
(e) a still having an inlet for a solvent-oil solution in an intermediate section, an outlet for solvent in an upper section, an outlet for oil in the bottom section, and heating means in a lower section thereof;
(f) conduit means connecting the outlet for solvent-oil solution of (b) with the inlet of (e); and
(g) conduit means connecting the solvent outlet of (e) with the solvent feed line of (d).

References Cited by the Examiner

UNITED STATES PATENTS

| | | | |
|---|---|---|---|
| 1,472,384 | 10/1923 | Brown | 252—327 |
| 1,920,565 | 8/1933 | Jones | 252—327 |
| 2,383,363 | 8/1945 | Batchelder | 252—327 |
| 2,431,526 | 11/1947 | Viles | 252—327 |
| 2,533,546 | 12/1950 | Albaugh et al. | 166—7 |
| 2,964,478 | 12/1960 | Monson | 252—331 |
| 3,107,726 | 10/1963 | Greenwald | 166—8 |

JULIUS GREENWALD, *Primary Examiner.*